United States Patent [19]

Bausch

[11] Patent Number: 4,588,910

[45] Date of Patent: May 13, 1986

[54] REVERSING SWITCH ARRANGEMENT FOR AN ELECTRIC TOOL

[75] Inventor: Alfred Bausch, Waldbrunn-Hintermeilingen, Fed. Rep. of Germany

[73] Assignee: Black & Decker Inc., Newark, Del.

[21] Appl. No.: 666,433

[22] Filed: Oct. 30, 1984

[30] Foreign Application Priority Data

Nov. 24, 1983 [DE] Fed. Rep. of Germany ....... 3342412

[51] Int. Cl.[4] ......................... H01H 9/26; H02K 7/14

[52] U.S. Cl. ..................................... 310/50; 200/1 V; 200/50 C; 200/157

[58] Field of Search .............. 200/1 V, 5 R, 5 B, 5 E, 200/5 EA, 5 EB, 17 R, 50 A, 50 C, 50 R, 61.85, 157; 310/68 A, 50, 47

[56] References Cited

U.S. PATENT DOCUMENTS 2,744,176 5/1956 Kaman .............................. 310/50 X
3,260,827 7/1966 Frenzel .............................. 200/157
3,267,223 8/1966 Larkin .......................... 200/50 C X
3,703,646 11/1972 Jacyno ............................ 200/1 V X
4,097,704 6/1978 Piber ............................. 200/1 V X
4,097,705 6/1978 Harvell .............................. 200/157
4,342,931 8/1982 Grossmann et al. ................. 310/50

FOREIGN PATENT DOCUMENTS 1436275 5/1976 United Kingdom .

*Primary Examiner*—J. R. Scott
*Attorney, Agent, or Firm*—Ronald B. Sherer; Harold Weinstein; Edward D. Murphy

[57] ABSTRACT

In a portable electric tool, a switch arrangement comprises a trigger on/off switch having a depressable trigger and a reversing switch having an actuating lever. An interlocking arrangement, operative between the lever and the trigger, prevents actuation of the reversing switch when the trigger is depressed. The lever comprises a pivoted bell crank, one of the legs of which carries part of the interlocking arrangement, and the other leg of which extends transversely to the trigger and engages with a slide manually slidable in an orifice in a side wall of the tool's housing to effect pivoting of the lever.

23 Claims, 7 Drawing Figures

REVERSING SWITCH ARRANGEMENT FOR AN ELECTRIC TOOL

FIELD OF THE INVENTION

This invention relates to a switch arrangement for an electric tool, particularly for portable electric tools such as, for example, drills, percussion drills, screwdrivers, etc. It particularly relates to the arrangement of a reversing switch in conjunction with the main on/off switch.

BACKGROUND OF THE INVENTION

It is known in reversible portable power drills to incorporate a pivoted actuating lever for the reversing switch above and adjacent the trigger of the trigger on/off switch, a retention pin on the acutating lever entering either of two retention slots in the trigger upon depression of the latter. In this way, the direction of the reversing switch has to be selected before the trigger is depressed to energise the tool, and while the trigger is depressed the actuating lever is prevented from being further actuated.

In such switch arrangements, conventionally the acutating lever for the reversing switch is located between the lower housing wall of the motor compartment and the upper part of the trigger. The trigger is accommodated adjacent the top of a pistol grip handle, so that the actuating lever is, therefore, arranged in the region of the transition between the pistol grip handle and the motor compartment housing, see for example U.S. Pat. No. 4,342,931. The actuating lever is long and extends forwardly beyond the trigger, the freely accessible forward end of the lever being manipulated by the fingers of the operator to pivot the lever.

In the above switch arrangement, there is a danger that the user will inadvertently pivot the actuating lever as he or she grips the tool's handle and moves the index finger into position to squeeze the trigger. Furthermore, there is a risk of the acutating lever being broken off during operation because of its relatively long pivoted length, particularly as it is made of electrically insulating plastic material.

SUMMARY OF THE INVENTION

The object of the invention is to provide an improved switch arrangement for reversing an electric tool.

A feature by which this object is achieved is the provision of a bell crank type lever for actuating the reversing switch and interlocking with the trigger of a trigger on/off switch. This has the advantage that the operation point for the reversing switch is located at one side of the tool's housing, preferably at the top of one side of a pistol grip handle, so minimizing the possibility of inadvertent operation.

Another preferred feature is the provision of a slide in the side wall of the tool's housing,and engaging an end of the bell crank therewith. This has the advantage that the reversing switch is operated by the slide which cannot be subjected by the user to such a load that the actuating lever can be inadvertently broken or damaged.

A further optional feature of the invention is the provision of slots of different depth in the trigger. This has the advantage that the depth through which the trigger can be depressed in one selected position of the reversing switch is limited, so enabling the speed of the tool to be limited in one direction of drive more than in the other direction of drive.

Accordingly, there is provided by the present invention a switch arrangement for an electric tool comprising a trigger-switch for energizing the electric tool and having a depressable trigger with two retention slots therein, a reversing switch, a pivoted bell crank lever having two legs, the lever being connected to the reversing switch for actuation thereof by pivoting of the lever, a retention projection adjacent an end of one of the legs, the retention projection engaging in a respective one of the retention slots upon actuation of the trigger depending upon the pivotal position of the lever, and the other of the legs extending transversely to the trigger for manual actuation to effect pivoting of the lever.

Preferably, the other leg engages with a manually operable slide displaceable along an orifice in a side wall of the tool's housing. The free end of this other leg may be formed with an enlarged head which engages in a cavity in the slide. The head preferably has a crowned peripheral surface to aid rotation thereof in the cavity.

An H-shaped adaptor may hold the reversing switch in the upper part thereof and the trigger-switch in the lower part thereof with the lever disposed between the reversing switch and the trigger-switch. The other leg of the lever may extend outwardly through an orifice in one side of the adaptor. By means of such an adaptor, the housing of the trigger-switch, the bell crank lever, and the housing of the reversing switch can be combined in a simple way into a single sub-assembly which can be inserted as such into the tool's housing.

Other objects, features and advantages of the present invention will become more fully apparent from the following detailed description of the preferred embodiment, the appended claims and the accompanying drawings.

DETAILED DESCRIPTION OF THE PREFERRED EMBODIMENT

Figure 1:
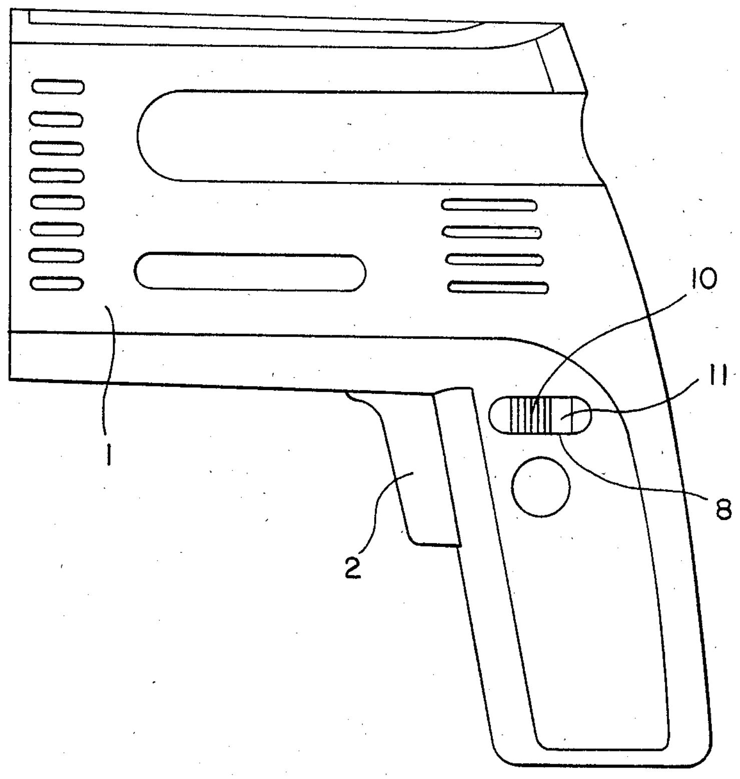
FIG. 1 is a side elevational view of the rear and handle portion of a portable electric drill incorporating a reversing switch and triggerswitch arrangement according to the invention.
Figure 2:
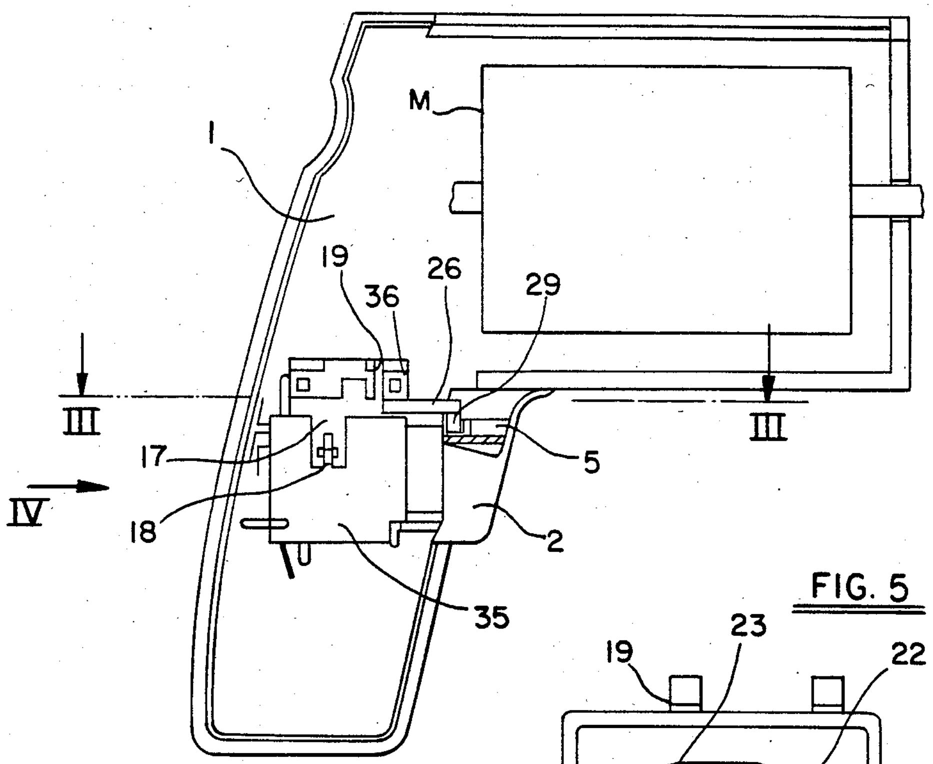
FIG. 2 is a similar view to FIG. 1 of the other side of the rear and handle portion of the drill, but with one clam-shell half of the housing removed to expose the reversing switch and trigger-switch arrangement; and with an upper portion of the trigger of the triggerswitch broken away and partially in section.
Figure 5:
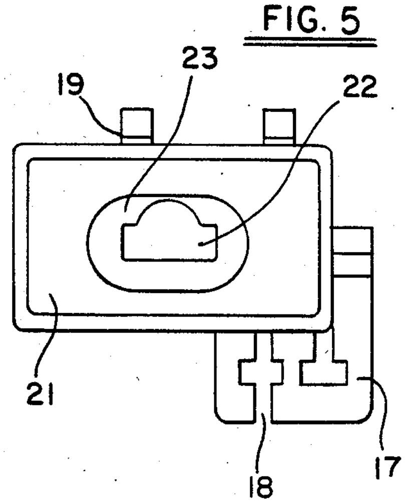
FIG. 5 is a side view of the adaptor of FIG. 4 in the direction of the arrow V in FIG. 4.
Figure 4:
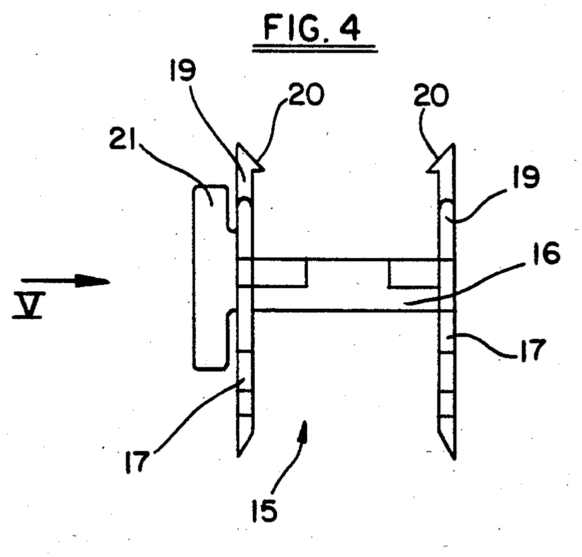
FIG. 4 is an end view in the direction of the arrow IV in FIG. 2 of an adaptor for mounting the reversing switch and trigger-switch arrangement in the handle of the drill.
Figure 3:
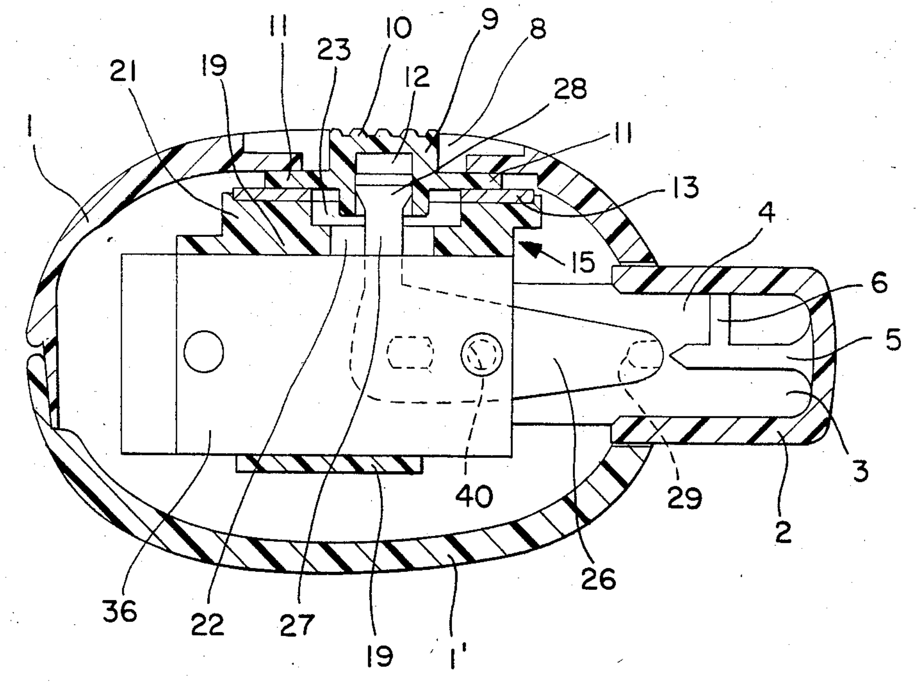
FIG. 3 is a section on the line III—III in FIG. 2.

The preferred embodiment of the invention is shown in a portable electric drill in FIGS. 1, 2 and 3, with particular components shown in FIGS. 4 to 7. To the front of the rear and handle portion shown in FIG. 1 is attached a front housing (not shown) from which extends a chuck (not shown) driven by the tool's electric motor M which is shown diagrammatically in FIG. 2.

The housing of the portion of the tool illustrated consists of two half-shells 1, 1' which form the pistol grip handle and motor housing of the portable power drill. As is customary in electronically controlled drills equipped for reversal of the direction of rotation, the main on/off switch, accommodated in a housing 35, and the reversing switch, accommodated in a housing 36, are located in the region of transition between the pistol grip handle and the motor housing. The wiring of the switches and the associated circuits are not shown in the Figures, but are of conventional design.

An H-shaped adaptor 15 (FIGS. 4 and 5), which can be made of plastic, serves for mounting the housings 35, 36 of the two switches. The housing 35 of the on/off trigger-switch is pushed in between two legs 17 of the adaptor 15 which extend downwards, so that projections on this housing penetrate into engagement with cut-outs 18 (FIGS. 2 and 5) in the adpator, and thus remains connected to the adaptor. a bell crank actuating lever 25 (FIGS. 6 and 7), to be described in greater detail later, is placed on the cross piece 16 of the adaptor 15, so that one of the legs 27 of the lever 25 extends through lateral orifices 22, 23 in a side 21% the adaptor 15 as shown in FIG. 3. The reversing switch housing 36 is then guided between the upper legs 19 of the adaptor 15 and pressed down therebetween until hooks 20 at the upper ends of the legs 19 engage with cut-outs in the reversing switch housing 36.

Figure 6:
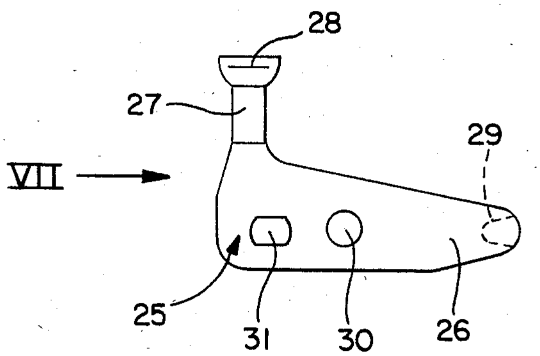
FIG. 6 is a plan view of the reversing switch actuating lever as shown in FIG. 3.
Figure 7:
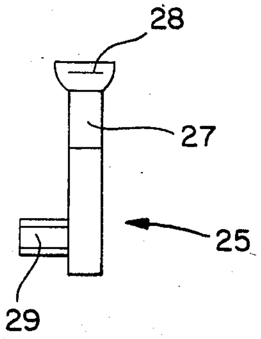
FIG. 7 is an end view of the actuating lever in the direction of the arrow VII in FIG. 6.

The actuating bell crank lever 25 is essentially L-shaped and carries at the free end of its leg 27 a head 28 with a crowned peripheral surface (FIGS. 3, 6 and 7). A retention pin 29 is formed on the free end of the other leg 26 and extends therefrom perpendicularly to the plane of the lever in which the two legs 26, 27 lie. The leg 26 is provided with a bore 30 and also with an aperture or cut-out 31. The centers of the retention pin 29, the bore 30, and the cut-out 31 are in line, with the cut-out 31 being on the side of the bore 30 opposite to the retention pin 29. When the housing 36 of the reversing switch is mounted on the adaptor 15 a pin 40 (indicated in broken lines in FIG. 3) provided on the underside of the housing 36 engages with the bore 30. An actuating element (not shown) projecting from the housing 36 for directly actuating the reversing switch, extends into the cut-out 31. Consequently, pivoting the actuating lever 25 about the pin engaged in the bore 30 results in actuation of the reversing switch.

The unit composed of the two switches and the actuating lever 25, and which is coupled together by the adaptor 15, is mounted in the housing in a manner now to be described.

In the housing shell 1 there is a lateral orifice 8, into which is inserted a slide 9 having a gripping surface 10 and lengthwise extending regions 11 which engage behind the sides of the orifice 8. The slide 9 can be moved to and fro in the sectional plane of FIG. 3.

The slide 9 is first introduced into the half-shell 1, so that it is in the position shown in FIG. 3. The unit coupled together by the adaptor 15 is then mounted in spaced apart seating locations in the half-shell 1. The other half-shell 1' has correponding seating locations. A felt layer 13 for tolerance compensation is arranged between the adaptor 15 and the extending regions 11 of the slide 9. A spring (not shown) with engagement lugs may be employed for additional retention if desired. In the mounted state, the head 28 of the actuating lever 25 extends into a cylindrical cavity 12 in the slide 9 (FIG. 3), the cavity 12 extending inside the raised button-like grip portion 10 of the slide 9.

In the further course of assembly, the trigger 2 for actuating the on/off trigger-switch is inserted. The trigger has two retention slots 3, 4 separated by a center wall 5 (FIG. 3). A transverse wall 6, partly across the trigger 2, causes the retention slot 4 to have less depth (or length) than the retention slot 3.

When the portable electric drill is in operation, the direction of rotation is set as a result of the displacement of the slide 9 into one of its two end positions. The actuating lever 25 is pivoted about the center axis of the bore 30, and the head 28 is able to rotate within the cavity 12 due to the crowned peripheral surface of the head. This pivoting of the actuating lever 25 displaces the retention pin 29 into a position aligned either in front of the retention slot 3 or in front of the retention slot 4. When the trigger 2 is pressed into the main switch housing 35 and the on/off switch is thus actuated, the retention pin 29 penetrates into the associated retention slot 3 or 5. In this actuated position of the trigger-switch, the position of the actuating lever is thus locked, and the user can no longer move the actuating lever 25 into another position by displacement of the slide 9. Thus, the position of the reversing switch cannot be changed while the trigger-switch is depressed.

The rotational speed of the drill is electronically controlled in known manner so that it increases with the increasing displacement or depression of the trigger 2 into the tool's housing. Consequently, higher rotational speed can be achieved when the retention pin 29 engages in the full length retention slot 3 than when the retention pin 29 engages in the retention slot 4 of less depth. The position for engagement of the retention pin 29 with the retention slot 4 is, therefore, arranged for the direction of rotation serving for the removal or loosening of screws and the like, while engagement with the retention slot 3 is assigned to the direction of rotation for normal drilling. That is, the difference in depth of the slots 3 and 4 enables the maximum reverse speed to be limited to less than the maximum forward speed.

As can be seen from FIG. 3, the leg 26 extends in the same direction as the trigger 2 and is adjacent to the trigger, while the other leg 27 extends transversely to the trigger and terminates adjacent the orifice 8 in the side wall of the handle.

It will be appreciated that by having the reversing control 9 in the side of the pistol grip handle, the trigger 2 can be located right up against the lower side of the motor compartment without the need for any gap therebetween. This has been found to be the most convenient position for easy operation of the trigger with the index finger. However, the bell crank lever 25 still enables the reversing control 9 to be located adjacent the trigger 2, and in such a position that it can readily be operated by the thumb of the hand grasping the pistol grip handle.

It should also be noted that by engaging one leg of the bell crank lever in the slide 9, the possibility of ingress of dirt and the like into the interior of the tool's housing at the location of the reversing control is prevented or minimized.

The above described embodiments, of course, are not to be construed as limiting the breadth of the present invention. Modifications, and other alternative constructions, will be apparent which are within the spirit and scope of the invention as defined in the appended claims.

What is claimed is:

1. A switch arrangement for an electric tool, comprising:

a trigger-switch for energizing the electric tool and having a depressable trigger with two separated slots therein, said trigger being depressable in a direction parallel to said slots;

a reversing switch;

means for connecting said reversing switch to said trigger-switch;

a pivoted bell crank lever having two legs, said lever being pivotal relative to said switches about an axis transverse to said direction;

said lever being connected to said reversing switch for actuation thereof by pivoting of said lever;

a retention projection adjacent an end of one of said legs and projecting parallel to said axis, said retention projection engaging in a respective one of said slots upon said trigger being depressed depending upon the pivotal position of said lever;

the other of said legs extending transversely to said trigger and said axis; and means, associated with a free end of said other of said legs, for manually displacing said free end in said direction for effecting pivoting of said lever.

2. The switch arrangement of claim 1, further comprising a manually operable slide in which engages said other leg for manual actuation thereof.

3. The switch arrangement of claim 2, wherein said slide has a cavity therein in which is engaged an enlarged head on a free end of said other leg.

4. The switch arrangement of claim 3, wherein said head has a crowned peripheral surface.

5. A switch arrangement for an electric tool, comprising:

a trigger-switch for energizing the electric tool and having a depressable trigger with two separated slots therein;

a reversing switch;

a pivoted bell crank lever having two legs;

said lever being connected to said reversing switch for actuation thereof by pivoting of said lever;

a retention projection adjacent an end of one of said legs, said retention projection engaging in a respective one of said slots upon actuation of said trigger depending upon the pivotal position of said lever;

the other of said legs extending transversely to said trigger for manual actuation to effect pivoting of said lever;

an H-shaped adaptor in an upper part of which said reversing switch is held and in a lower part of which said trigger switch is held; and said lever being disposed between said reversing switch and said trigger switch with said other leg extending outwardly through an orifice in one side of said adaptor.

6. The switch arrangement of claim 1, wherein said lever is pivotaly connected to said reversing switch by a pin on the latter engaging in a bore in said one leg.

7. The switch arrangement of claim 6, wherein said one leg has a cut-out therein for actuating said reversing switch, said bore being disposed between said cut-out and said retention pin.

8. The switch arrangement of claim 1, wherein the distance through which said trigger is manually actuated determines the speed of the electric tool, and said two slots have different depths.

9. In a portable electric tool having a housing, a switch arrangement comprising:

a trigger on/off switch having a depressable actuating trigger;

a reversing switch having a pivoted actuating lever;

retention means, operative between said lever and said trigger, for preventing pivoting of said lever to effect actuation of said reversing switch while said trigger is depressed;

said actuating lever being L-shaped with two legs;

one of said legs carrying a part of said retention means; and the other of said legs extending transversely to said trigger and engaging with a slide manually slidable in an orifice in a side wall of said housing to effect pivoting of said lever.

10. The switch arrangement of claim 9, wherein said retention means comprises two separated retention slots formed in said trigger, and said part of said retention means comprises a protrusion extending from a free end of said one leg.

11. The switch arrangement of claim 10, wherein the speed of the electric tool depends upon the depth ot which said trigger is depressed, and said retention slots have different depths.

12. The switch arrangement of claim 9, wherein a free end of said other leg is provided with a head having a crowned peripheral surface, and said head extends into a cylindrical recess in said slide.

13. The switch arrangement of claim 9, wherein said reversing switch is provided with a pivot pin which engages in a bore in said lever, and said lever is pivoted about said pin by displacement of said slide.

14. The switch arrangement of claim 13, wherein a cut-out engaged with said reversing switch for actuation thereof and said bore are located in said one leg, said cut-out being located between said bore and a region of connection of said legs.

15. The switch arrangement of claim 9, wherein said lever is located between a housing of said trigger on/off switch and a housing of said reversing switch.

16. The switch arrangement of claim 15, wherein the trigger on/off swtich housing is held in a lower part of an H-shaped adaptor and the reversing switch housing is held in an upper part thereof, said lever being located between a lower side of the reversing switch housing and a cross piece of the H-shaped adaptor.

17. A portable electric tool, comprising:

a housing having a motor compartment and a pistol grip handle;

a trigger switch mounted in said housing with a depressable actuating trigger extending in a forward direction from said handle immediately below said motor compartment;

a reversing switch mounted in said housing;

a bell crank lever having two legs, said bell crank lever being pivotally mounted in said housing and disposed between said reversing switch and said trigger switch, said lever being pivotal about an axis which is at right angles to said direction;

one leg of said bell crank lever extending in said forward direction and engaging in said trigger;

means, operative between said one leg and said trigger, for preventing pivoting of said lever when said trigger is depressed;

the other leg of said bell crank extending transversely to said trigger and engaging in a cavity in a manually operable slide mounted slidably in an orifice in a side wall of said handle; and said one leg being connected intermediate its length with said reversing switch for actuation thereof upon pivoting of said bell crank lever effected by manual displacement of said slide.

18. The portable electric tool of claim 17, wherein said means comprises a pin at the free end of said one leg slidably engageable in either of two slots in said trigger depending upon the pivotal position of said lever, one of said slots being deeper than the other to enable said trigger to be depressed deeper when said pin in engaged therein; said other leg having a head formed thereon and engaged in said cavity; an adaptor having pairs of legs between which said switches are mounted; and said slide having oppositely extending side portions engaged between the inside of said side wall and said adaptor.

19. A portable electric tool, comprising:

a housing having a motor compartment and a handle extending downwardly thereform;

a trigger switch in said housing and having a depressable actuating trigger, said trigger extending forwardly from said handle in a longitudinal direction;

a reversing switch in said housing;

an adaptor mounted in said housing, said trigger switch and said reversing switch being mounted in said adaptor with said reversing switch above said trigger switch;

a bell crank lever having two legs extending transversely to each other, said lever being pivotally connected to said reversing switch and being pivotal between two positions for actuating said reversing switch;

said trigger having two slots therein, said slots being disposed side by side and extending parallel to said direction;

one of said legs extending forwardly in said direction and having a downward projection engageable in a respective one of said slots, depending upon the pivotal position of said lever, when said trigger is depressed;

said trigger having a partition between said slots and which coacts with said projection to prevent pivoting of said lever when said trigger is depressed; and the other of said legs extending transversely to said trigger and engaging in a cavity in a manually operable slide mounted slidably in an orifice in a side wall of said handle.

20. The portable electric tool of claim 19, wherein an outer end of said other leg has a head with a crowned peripheral surface, said cavity is cylindrical, said slide has extending regions which engage behind said side wall, and said slide has a gripping portion which projects through said orifice.

21. A portable electric tool, comprising:

a housing having a handle, the handle having a front wall and two side walls;

an electric motor mounted in said housing;

trigger switch means, mounted in said housing and having a depressable actuating trigger extending forwardly through said front wall, for switching said motor on and off;

reversing switch means, mounted in said housing, for reversing the direction of rotation of said motor;

an L-shaped lever having two legs, said lever being operatively connected to said reversing switch means for actuating the latter;

means for pivotally mounting said lever inside said housing for pivoting of said lever about an axis disposed between said side walls and transverse to a direction in which said trigger is depressable;

one of said legs of said lever extending forwardly and having a projection selectively positionable on either side of a partition in said trigger by pivoting said lever, said projection and said partition interacting to prevent pivoting of said lever when said trigger is depressed;

the other of said legs extending towards an orifice in one of said side walls; and means extending through said orifice, for manually actuating said other leg for pivoting said lever to actuate said reversing switch when said trigger is not depressed.

22. The portable electric tool of claim 21, wherein said axis is perpendicular to said two legs and to said direction in which said trigger is depressable.

23. The portable electric tool of claim 21, wherein said trigger has two slots separated by said partition, said projection engaging in either slot depending upon which side of said partition said projection is positioned, and wherein one of said two slots is longer than the other in said direction in which said trigger is depressable to enable the trigger to be depressed a greater distance in one actuated position of the reversing switch than in another actuated position of the reversing switch.

* * * * *